(12) United States Patent
Casey et al.

(10) Patent No.: US 9,392,330 B2
(45) Date of Patent: Jul. 12, 2016

(54) IPTV FOLLOW ME CONTENT SYSTEM AND METHOD

(71) Applicant: Qwest Communications International Inc., Denver, CO (US)

(72) Inventors: Steven M. Casey, Littleton, CO (US); Gnanasegeran Selvadurai, Lafayette, CO (US); Felipe Castro, Erie, CO (US); Waqar Khan, Castle Rock, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 14/331,145

(22) Filed: Jul. 14, 2014

(65) Prior Publication Data

US 2014/0337877 A1    Nov. 13, 2014

Related U.S. Application Data

(63) Continuation of application No. 13/539,712, filed on Jul. 2, 2012, now Pat. No. 8,819,720, which is a continuation of application No. 12/061,046, filed on Apr. 2, 2008, now Pat. No. 8,238,559.

(51) Int. Cl.
*G06F 7/04* (2006.01)
*H04N 5/445* (2011.01)
*H04N 21/4627* (2011.01)
(Continued)

(52) U.S. Cl.
CPC ............ *H04N 21/4627* (2013.01); *H04L 63/10* (2013.01); *H04N 21/26613* (2013.01); *H04N 21/4181* (2013.01); *H04N 21/4325* (2013.01); *H04N 21/441* (2013.01); *H04N 21/4415* (2013.01); *H04N 21/472* (2013.01); *H04N 21/4753* (2013.01); *H04N 21/6334* (2013.01);
(Continued)

(58) Field of Classification Search
None
See application file for complete search history.

(56) References Cited

U.S. PATENT DOCUMENTS 5,191,410 A    3/1993    McCalley et al.
5,289,371 A    2/1994    Abel et al.
(Continued)

FOREIGN PATENT DOCUMENTS

WO    WO 200509 1626    1/2005

OTHER PUBLICATIONS dynamism.com, Sony MSV-A1—Portable TV, http://www.dynamism.com/msv-al/, dated Jul. 20, 2004, 1 page.
(Continued)

*Primary Examiner* — Dede Zecher
*Assistant Examiner* — Trang Doan
(74) *Attorney, Agent, or Firm* — Swanson & Bratschun, L.L.C.

(57) ABSTRACT

Tools are provided for distributing access-restricted content in an internet protocol television ("IPTV") environment based on portable entitlement keys. Such tools can include a decoder, an encoder, and a network entitlement handler. The decoder may be configured to receive a key associated with entitlement information, and transmit the entitlement information over a network. The encoder may be configured to receive content from content providers, and to encode the content to create IP-compatible content, with access restrictions based on entitlement. The network entitlement handler may be configured to receive a request for requested content from the decoder; receive the access-restricted content including (including the requested content) from the encoder; and transmit the requested content over the network to the decoder using IP, when the decoder is entitled to receive the requested content.

23 Claims, 10 Drawing Sheets

(51) Int. Cl.

| | |
|---|---|
| *H04L 29/06* | (2006.01) |
| *H04N 21/418* | (2011.01) |
| *H04N 21/432* | (2011.01) |
| *H04N 21/6334* | (2011.01) |
| *H04N 21/266* | (2011.01) |
| *H04N 21/441* | (2011.01) |
| *H04N 21/4415* | (2011.01) |
| *H04N 21/472* | (2011.01) |
| *H04N 21/475* | (2011.01) |
| *H04N 21/643* | (2011.01) |
| *G06F 17/30* | (2006.01) |
| *G06F 15/173* | (2006.01) |

(52) U.S. Cl.
CPC .. *H04N 21/64322* (2013.01); *G06F 2221/2141* (2013.01); *H04L 2463/101* (2013.01)

(56) References Cited

U.S. PATENT DOCUMENTS

| | | | |
|---|---|---|---|
| 5,600,573 | A | 2/1997 | Hendricks et al. |
| 5,659,653 | A | 8/1997 | Diehl et al. |
| 5,790,935 | A | 8/1998 | Payton |
| 5,918,013 | A | 6/1999 | Mighdoll et al. |
| 5,945,988 | A | 8/1999 | Williams et al. |
| 6,035,038 | A | 3/2000 | Campinos et al. |
| 6,173,316 | B1 | 1/2001 | De Boor |
| 6,237,031 | B1 | 5/2001 | Knauerhase et al. |
| 6,256,691 | B1 | 7/2001 | Moroz |
| 6,536,041 | B1 | 3/2003 | Knudson |
| 6,698,020 | B1 | 2/2004 | Zigmond et al. |
| 6,741,684 | B2 | 5/2004 | Kaars |
| 7,089,309 | B2 | 8/2006 | Ramaley et al. |
| 7,103,906 | B1 | 9/2006 | Katz |
| 7,165,725 | B2 | 1/2007 | Casey |
| 7,386,871 | B1 | 6/2008 | Knudson et al. |
| 7,444,658 | B1 | 10/2008 | Matz et al. |
| 7,454,709 | B1 | 11/2008 | Appelman |
| 7,568,209 | B1 | 7/2009 | Addington et al. |
| 7,592,912 | B2 | 9/2009 | Hasek et al. |
| 7,654,462 | B2 | 2/2010 | Casey |
| 8,015,167 | B1 | 9/2011 | Riggs et al. |
| 8,583,758 | B2 | 11/2013 | Casey et al. |
| 8,621,531 | B2 | 12/2013 | Casey et al. |
| 8,752,090 | B2 | 6/2014 | Casey et al. |
| 8,819,720 | B2 | 8/2014 | Casey et al. |
| 2001/0011284 | A1 | 8/2001 | Humpleman et al. |
| 2001/0047517 | A1 | 11/2001 | Christopoulos et al. |
| 2002/0016919 | A1 | 2/2002 | Sims |
| 2002/0016971 | A1 | 2/2002 | Berezowski et al. |
| 2002/0026645 | A1 | 2/2002 | Son et al. |
| 2002/0027992 | A1* | 3/2002 | Matsuyama ............ G06F 21/10 380/231 |
| 2002/0044199 | A1 | 4/2002 | Barzebar et al. |
| 2002/0049977 | A1 | 4/2002 | Miller et al. |
| 2002/0056109 | A1 | 5/2002 | Tomsen |
| 2002/0069223 | A1 | 6/2002 | Goodisman et al. |
| 2002/0069420 | A1 | 6/2002 | Russell et al. |
| 2002/0075332 | A1 | 6/2002 | Geilfuss et al. |
| 2002/0104099 | A1 | 8/2002 | Novak |
| 2002/0118954 | A1 | 8/2002 | Barton et al. |
| 2002/0144279 | A1 | 10/2002 | Zhou |
| 2002/0174430 | A1 | 11/2002 | Ellis et al. |
| 2002/0188945 | A1 | 12/2002 | McGee et al. |
| 2003/0009765 | A1 | 1/2003 | Linden et al. |
| 2003/0018971 | A1 | 1/2003 | McKenna, Jr. |
| 2003/0050062 | A1 | 3/2003 | Chen |
| 2003/0086023 | A1 | 5/2003 | Chung et al. |
| 2003/0098869 | A1 | 5/2003 | Arnold |
| 2003/0145331 | A1 | 7/2003 | Escobar et al. |
| 2003/0149975 | A1 | 8/2003 | Eldering et al. |
| 2003/0149988 | A1 | 8/2003 | Ellis |
| 2003/0193484 | A1 | 10/2003 | Lui et al. |
| 2003/0226142 | A1 | 12/2003 | Rand |
| 2004/0008972 | A1 | 1/2004 | Haken |
| 2004/0024702 | A1 | 2/2004 | Angel et al. |
| 2004/0039781 | A1 | 2/2004 | LaVallee et al. |
| 2004/0088558 | A1* | 5/2004 | Candelore ............ H04N 7/1675 713/193 |
| 2004/0111756 | A1 | 6/2004 | Stuckman et al. |
| 2004/0117248 | A1 | 6/2004 | Dutta |
| 2004/0117831 | A1 | 6/2004 | Ellis et al. |
| 2004/0143620 | A1 | 7/2004 | Fisher et al. |
| 2005/0010635 | A1 | 1/2005 | Schwesig et al. |
| 2005/0021414 | A1 | 1/2005 | Liebenow |
| 2005/0034171 | A1 | 2/2005 | Benya |
| 2005/0038996 | A1* | 2/2005 | Meyerson ............ G06F 21/6218 713/165 |
| 2005/0047752 | A1 | 3/2005 | Wood et al. |
| 2005/0060759 | A1 | 3/2005 | Rowe et al. |
| 2005/0102385 | A1 | 5/2005 | Muhonen et al. |
| 2005/0108769 | A1 | 5/2005 | Arnold et al. |
| 2005/0130685 | A1 | 6/2005 | Jenkin |
| 2005/0143136 | A1 | 6/2005 | Lev et al. |
| 2005/0155063 | A1 | 7/2005 | Bayrakeri et al. |
| 2005/0195978 | A1 | 9/2005 | Babic et al. |
| 2005/0198290 | A1 | 9/2005 | Berkey et al. |
| 2005/0210507 | A1 | 9/2005 | Hawkins et al. |
| 2005/0216594 | A1 | 9/2005 | O'Brien et al. |
| 2005/0216756 | A1* | 9/2005 | Alve ........................ G06F 21/10 713/193 |
| 2005/0262540 | A1 | 11/2005 | Swix et al. |
| 2005/0262542 | A1 | 11/2005 | DeWeese et al. |
| 2005/0273833 | A1 | 12/2005 | Soinio |
| 2006/0046744 | A1 | 3/2006 | Dublish et al. |
| 2006/0143481 | A1* | 6/2006 | Morten .................... G06F 21/10 713/193 |
| 2006/0168123 | A1 | 7/2006 | Krstulich |
| 2006/0205434 | A1 | 9/2006 | Tom et al. |
| 2006/0265427 | A1 | 11/2006 | Cohen et al. |
| 2006/0271652 | A1 | 11/2006 | Stavrakos et al. |
| 2006/0280303 | A1 | 12/2006 | Gupte |
| 2006/0282304 | A1 | 12/2006 | Bedard et al. |
| 2007/0083901 | A1 | 4/2007 | Bond |
| 2007/0088850 | A1 | 4/2007 | Alperin et al. |
| 2007/0121651 | A1 | 5/2007 | Casey et al. |
| 2007/0121856 | A1 | 5/2007 | Alperin et al. |
| 2007/0121940 | A1 | 5/2007 | Park |
| 2007/0124416 | A1 | 5/2007 | Casey et al. |
| 2007/0124769 | A1 | 5/2007 | Casey et al. |
| 2007/0124779 | A1 | 5/2007 | Casey |
| 2007/0124781 | A1 | 5/2007 | Casey et al. |
| 2007/0130155 | A1 | 6/2007 | Alperin et al. |
| 2007/0130340 | A1 | 6/2007 | Alperin et al. |
| 2007/0192807 | A1 | 8/2007 | Howcroft |
| 2007/0239833 | A1 | 10/2007 | Alperin et al. |
| 2007/0239880 | A1 | 10/2007 | Alperin et al. |
| 2007/0239895 | A1 | 10/2007 | Alperin et al. |
| 2007/0240065 | A1 | 10/2007 | Alperin et al. |
| 2007/0257100 | A1* | 11/2007 | Chase-Salerno ...... G06Q 20/341 235/380 |
| 2007/0271532 | A1 | 11/2007 | Nguyen et al. |
| 2008/0046922 | A1* | 2/2008 | Jankins ............... H04N 7/17318 725/35 |
| 2008/0092157 | A1* | 4/2008 | Walter ............... H04N 7/17354 725/25 |
| 2008/0098442 | A1 | 4/2008 | Greenbaum |
| 2008/0181189 | A1 | 7/2008 | Yoo |
| 2008/0271101 | A1 | 10/2008 | Doherty |
| 2008/0279215 | A9 | 11/2008 | Wendling et al. |
| 2009/0007171 | A1 | 1/2009 | Casey et al. |
| 2009/0007176 | A1 | 1/2009 | Casey |
| 2009/0063645 | A1 | 3/2009 | Casey et al. |
| 2009/0252329 | A1 | 10/2009 | Casey et al. |
| 2010/0333153 | A1 | 12/2010 | Sahota et al. |
| 2012/0124612 | A1* | 5/2012 | Adimatyam ...... H04N 21/25841 725/27 |
| 2012/0272260 | A1 | 10/2012 | Casey et al. |

OTHER PUBLICATIONS

Grumet, Andrew, "Hack: RSS Powered Tivo to-Do Lists"; http://grumet.net/writing/programmer/syndication/rss-powered-tivo-todo-lists, 6 pages, Jul. 14, 2005.

(56) References Cited

OTHER PUBLICATIONS

IBM Research, "Intermediares and Transcoding," http://web.archive.org/web/20021219072117/http://www.almaden.ibm.com/cs/wbi/wbi-an, 2 pages, Oct. 8, 2008.
Ortikon Interactive Ltd., "Ortikon ACE IPTV Middleware," 8 pages, no date.
Sony Portable TV & MPEG4 recorder, http://www.icube.us/sony_msv-al/product_overview.htm, dated Jul. 20, 2004, 1 page.
Television is coming to a cell phone near you. http://pd.pennet.com/Articles/Article_Display.cfm?Section=Articles&Subsection=Display&ARTICLE_ID; dated Jul. 20, 2004, 4 pages.
Xvision Systems, Play and Convert your media files; mp3, way, asf, avi, mpg and more . . . , About MPG, MPEG-4, http://www.svonline.com/xfiles,about_mpg.htm, dated Oct. 28, 2004, 2 pages.
U.S. Appl. No. 11/291,274; Issue Notification dated Dec. 11, 2013; 1 page.
U.S. Appl. No. 11/291,274; Notice of Allowance and Examiner Initiated Interview Summary received dated Aug. 22, 2013; 52 pages.
U.S. Appl. No. 11/291,274; Notice to File Corrected Application Papers dated Oct. 11, 2013; 3 pages.
U.S. Appl. No. 11/291,324; Final Rejection dated Apr. 9, 2014; 39 pages.
U.S. Appl. No. 11/291,324; Final Rejection dated Jul. 26, 2012; 28 pages.
U.S. Appl. No. 11/291,324; Non Final Office Action dated Jan. 3, 2012; 32 pages.
U.S. Appl. No. 11/291,324; Non-Final Rejection dated Oct. 3, 2013; 38 pages.
U.S. Appl. No. 11/291,326, Final Rejection dated Nov. 29, 2012; 40 pages.
U.S. Appl. No. 11/291,326; Issue Notification dated Oct. 23, 2013; 1 page.
U.S. Appl. No. 11/291,326; Notice of Allowance dated Jul. 9, 2013; 35 pages.
U.S. Appl. No. 12/061,046; Final Office Action dated Oct. 14, 2011; 17 pages.
U.S. Appl. No. 12/061,046; Notice of Allowance dated Apr. 2, 2012; 35 pages.
U.S. Appl. No. 12/061,046; Supplemental Notice of Allowability dated Apr. 19, 2012; 5 pages.
U.S. Appl. No. 12/147,652, Non-Final Rejection dated Oct. 26, 2012; 29 pages.
U.S. Appl. No. 12/147,652; Corrected Notice of Allowability dated May 15, 2014; 3 pages.
U.S. Appl. No. 12/147,652; Issue Notification dated May 21, 2014; 1 page.
U.S. Appl. No. 12/147,652; Notice of Allowance and Examiner Interview Summary dated Jan. 31, 2014; 31 pages.
U.S. Appl. No. 12/147,652, Final Rejection dated Mar. 20, 2013; 30 pages.
U.S. Appl. No. 12/147,674; Non-Final Rejection dated May 10, 2012; 59 pages.
U.S. Appl. No. 12/147,674; Non-Final Rejection dated Jan. 2, 2014; 65 pages.
U.S. Appl. No. 13/539,712; Issue Notification dated Aug. 6, 2014; 1 page.
U.S. Appl. No. 13/539,712; Non-Final Office Action dated Dec. 9, 2013; 27 pages.
U.S. Appl. No. 13/539,712; Notice of Allowance dated Apr. 14, 2014; 21 pages.
U.S. Appl. No. 11/291,274; Non Final Office Action dated Jan. 10, 2012; 45 pages.
U.S. Appl. No. 12/061,046; Office Action dated Apr. 28, 2011; 22 pages.
U.S. Appl. No. 12/147,674; Final Rejection dated Oct. 19, 2012; 63 pages.
U.S. Appl. No. 12/147,674; Final Rejection dated May 21, 2014; 64 pages.
U.S. Appl. No. 11/060,222, Notice of Allowability, dated Nov. 17, 2006, 4 pages.
U.S. Appl. No. 11/060,222, Notice of Allowance, dated Nov. 17, 2006, 3 pages.
U.S. Appl. No. 11/060,222, Office Action dated Jan. 24, 2006, 10 pages.
U.S. Appl. No. 11/060,222, Office Action dated Jun. 15, 2006, 11 pages.
U.S. Appl. No. 11/060,222, Office Action dated Oct. 19, 2005, 10 pages.
U.S. Appl. No. 11/291,274, Office Action dated Jul. 19, 2011, 43 pages.
U.S. Appl. No. 11/291,274, Office Action dated Aug. 18, 2010, 38 pages.
U.S. Appl. No. 11/291,274, Final Office Action dated Feb. 15, 2011, 46 pages.
U.S. Appl. No. 11/291,274, Final Rejection dated Mar. 20, 2013; 54 pages.
U.S. Appl. No. 11/291,274, Non-Final Rejection dated Aug. 21, 2012; 55 pages.
U.S. Appl. No. 11/291,274, Office Action dated Jul. 19, 2011, 42 pages.
U.S. Appl. No. 11/291,324, Final Office Action, dated Apr. 22, 2009, 21 pages.
U.S. Appl. No. 11/291,324, Final Rejection, dated May 26, 2010, 22 pages.
U.S. Appl. No. 11/291,324, Office Action dated Nov. 12, 2009, 21 pages.
U.S. Appl. No. 11/291,324, Office Action, dated Oct. 28, 2008, 16 pages.
U.S. Appl. No. 11/291,325, Final Rejection, dated Apr. 1, 2009, 36 pages.
U.S. Appl. No. 11/291,325, Office Action, dated Oct. 22, 2008, 101 pages.
U.S. Appl. No. 11/291,326, Final Rejection dated Feb. 24, 2009, 17 pages.
U.S. Appl. No. 11/291,326, Final Rejection dated Jan. 22, 2010, 23 pages.
U.S. Appl. No. 11/291,326, Office Action dated Jul. 13, 2009, 19 pages.
U.S. Appl. No. 11/291,326, Office Action dated Oct. 14, 2008, 19 pages.
U.S. Appl. No. 11/291,326; Non-Final Rejection dated Sep. 14, 2012; 47 pages.
U.S. Appl. No. 11/291,806, Final Rejection dated Apr. 29, 2009, 32 pages.
U.S. Appl. No. 11/291,806, Office Action dated Oct. 28, 2008, 34 pages.
U.S. Appl. No. 12/061,046, Issue Notification dated Jul. 18, 2012; 1 page.
U.S. Appl. No. 12/061,046, Non-Final Office Action dated Apr. 28, 2011, 22 pages.
U.S. Appl. No. 12/147,652, Office Action dated Mar. 1, 2011, 25 pages.
U.S. Appl. No. 12/147,652, Final Office Action dated Jan. 4, 2012, 20 pages.
U.S. Appl. No. 12/147,652, Office Action dated Aug. 18, 2011, 22 pages.
U.S. Appl. No. 12/147,665, Final Rejection dated Dec. 3, 2010, 32 pages.
U.S. Appl. No. 12/147,665, Office Action dated Jun. 25, 2010, 26 pages.
U.S. Appl. No. 12/147,665; Non-Final Rejection dated Jun. 12, 2014; 46 pages.
U.S. Appl. No. 12/147,674, Office Action dated Dec. 22, 2010, 41 pages.
U.S. Appl. No. 12/147,674, Office Action dated Jun. 15, 2011, 42 pages.
U.S. Appl. No. 12/147,665, Final Rejection dated Oct. 30, 2014; 43 pages.
U.S. Appl. No. 12/147,674; Non-Final Rejection dated Mar. 11, 2015; 69 pages.
U.S. Appl. No. 12/147,674; Final Rejection dated Aug. 26, 2015; 73 pages.

* cited by examiner

IPTV FOLLOW ME CONTENT SYSTEM AND METHOD

CROSS REFERENCE TO RELATED APPLICATION

This application is a continuation of U.S. patent application Ser. No. 13/539,712, filed Jul. 2, 2012 by Casey et al. and entitled, "IPTV Follow Me Content System and Method", which is a continuation of U.S. patent application Ser. No. 12/061,046 (now U.S. Pat. No. 8,238,559), filed Apr. 2, 2008 by Casey et al. and entitled, "IPTV Follow Me Content System and Method", both of which is hereby incorporated by reference in its entirety.

BACKGROUND OF THE INVENTION

Embodiments of the invention are related to the provision of telecommunication services, and in particular, to the provision of video and/or data services to a subscriber premises.

Internet Protocol-based television ("IPTV") generally describes systems which deliver digital television and related services over a network infrastructure using a suite of protocols generally described by the term TCP/IP, and more generally referred to as Internet Protocol ("IP"). As with other types of television service provision, customers may have accounts which are linked to certain access rights, or entitlements. Using customer entitlements, service providers may mediate between the customers and the content providers to restrict or allow certain types of access, for example, by limiting availability, quality, or bandwidth of services. Further, service providers may be able to provide or limit additional services to customers based on a customer's entitlement by offering, for example, content storage or personalized services.

Many service providers issue entitlement keys to customers, which allow the service providers to associate customer accounts with customer entitlements. Typically, the entitlement keys are fixed to a location or a device, like a set-top box at the customer's home. As such, a customer's entitlements may only be available to that customer while at home, or in other limited circumstances.

There may be a general need in the art, therefore, for portable entitlement keys. Using portable entitlement keys, customers may be able to provide service providers with their entitlements without being restricted to substantially fixed locations or devices.

BRIEF SUMMARY OF THE INVENTION

Embodiments of the invention provide tools, including without limitation methods, systems, and apparatuses, for providing and using portable entitlement keys to regulate the distribution of access-restricted content in an IPTV environment. A customer may use a portable entitlement key to provide entitlement information to the IPTV system, and the customer may request IPTV content from content providers. A network entitlement handler unit may then mediate between the content providers and the customer by transmitting the requested IPTV content to the customer after determining that the customer is entitled to receive the requested content.

One set of embodiments provides a system for distributing access-restricted content in an IPTV environment. The system includes a decoder unit, an encoder unit, and a network entitlement handler unit. The decoder unit may be in communication with a network and/or may be locatable in the network by a network address, and configured to receive a key from a key store, the key store being associated with an account and configured to store the key, the key being associated with a set of access rights associated with the account; and transmit, over the network, entitlement information relating to the set of access rights. The encoder unit may be configured to receive content from a plurality of content providers; encode at least a portion of the content to create access-restricted content, which might be access-restricted content having limited accessibility based at least in part on the set of access rights; and/or transmit at least a portion of the access-restricted content, for example, over the network and/or using the internet protocol. The network entitlement handler unit may be in operative communication with the encoder unit and the network, and may be configured to receive, over the network from the decoder unit, a request for a requested content set; receive, from the encoder unit, at least a portion of the access-restricted content, the portion of access-restricted content comprising at least a portion of the requested content set; receive the network address corresponding to the requesting decoder unit; and transmit a transmitted portion of the requested content set over the network to the network address using a transmission scheme, the transmission scheme comprising the internet protocol.

In some embodiments, the system further includes portable entitlement keys. Each entitlement key may include the key store; a key provider unit, in operative communication with the key store, and configured to provide the key associated with the key store to the decoder unit; and a portable chassis, operatively coupled with the key store and the key provider unit. In certain embodiments, the portable chassis encloses at least one of the key store or the key provider unit. Further, in certain embodiments, the key provider unit is configured to be compatible with a plurality of decoder units and to provide the key to the plurality of decoder units.

In some embodiments, the decoder unit includes a port. In certain embodiments, the port is configured to provide an electromagnetic interface for at least a portion of the portable chassis such that the decoder unit may receive the key from the key provider unit through the port. In other embodiments, the port is configured to provide an electromagnetic interface for at least a portion of the portable chassis such that the decoder unit may receive the key from the key provider unit through the port; and to provide a physical interface for at least a portion of the portable chassis such that at least a portion of the portable chassis may be removably coupled to the decoder unit at the port.

Another set of embodiments provides a network entitlement handler apparatus for distributing access-restricted content in an internet protocol-based television environment. The apparatus, in particular embodiments, includes a request receiver unit, a content receiver unit, a determiner unit, and a content transmitter unit. The request receiver unit may be configured to receive, from a network, a network address associated with a decoder unit in operative communication with the network; entitlement information associated with a requesting key, the requesting key stored in a key store and associated with a set of access rights associated with an account; and a request for a requested content set. The content receiver unit may be configured to receive access-restricted content from a content provider, the access-restricted content comprising at least a portion of the requested content set. The determiner unit may be configured to determine, based at least on the entitlement information, whether the account has an entitlement to receive the requested content set. The content transmitter unit may be configured to transmit, only if the account has the entitlement to receive the requested content set, at least a portion of the requested content set over the network to the network address using the internet protocol.

Yet another set of embodiments provides a method for distributing access-restricted content in an internet protocol-based television environment. The method, in an aspect, includes receiving, over a network, entitlement information relating to a set of access rights associated with an account; receiving a requested content set over the network from a requester, receiving access-restricted content comprising the requested content set, the access-restricted content being compatible with the internet protocol and having limited accessibility based at least in part on the entitlement information; determining, based at least in part on the entitlement information, whether the account has an entitlement to receive the requested content set; and transmitting, based at least in part on determining that the account has the entitlement to receive the requested content set, a transmitted portion of the requested content set over the network to the requester using a transmission scheme comprising the internet protocol. In some embodiments, the method includes receiving a requesting key at the requester from a portable key provider unit, wherein the requesting key is associated with the set of access rights associated with the account.

Still another set of embodiments provides a portable entitlement key for use in an internet protocol-based television environment. The apparatus includes a storage means for storing a key associated with a set of access rights for an account; and a provision means for providing the key to at least two decoder means. Each decoder means may include a means for receiving the key, a means for transmitting entitlement information relating to the set of access rights over a network, and a means for receiving media content over the network, at least partially by using the internet protocol, wherein access to at least a portion of the media content is restricted at least in part in relation to the set of access rights. In some embodiments, the portable entitlement key includes a housing means for portably housing the storage means and the provision means. In certain embodiments, the housing means further includes a means for interfacing with at least one of the decoder means.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION OF THE INVENTION

Embodiments of the invention provide a novel model for the distribution of content in an Internet Protocol-based television ("IPTV") environment. Various embodiments provide devices, methods, systems, and apparatuses for providing such services by using portable entitlement keys. Using portable keys may allow account entitlements to follow account-holders, possibly allowing greater access to IPTV services.

As used herein, references to IPTV, internet protocol ("IP"), the Internet, and other protocol-based environments are intended to be construed to encompass any similar environments and should not be taken as limiting the scope of the invention. For example, embodiments of the invention may apply to local area networks or other network environments other than the Internet, which may or may not use IP as a communication protocol. Further, as used herein, the term "entitlement" should be broadly construed to include any type of access rights or privileges. For example, entitlement may include access to a certain content distribution network, access to certain content on that network, system capabilities and/or limitations for accessing and/or viewing content, etc.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details.

Several embodiments of the invention are described below, and while various features are ascribed to different embodiments, it should be appreciated that the features described with respect to one embodiment may be incorporated with another embodiments as well. By the same token, however, no single feature or features of any described embodiment should be considered essential to the invention, as other embodiments of the invention may omit such features. Further, while the embodiments are described with reference to the Internet Protocol (IP) and Internet-Protocol-based television (IPTV), these phrases should not be construed as limiting. Rather, the embodiments of the invention may be implemented in any network-based content distribution system which uses entitlement to control access to content.

Figure 1:
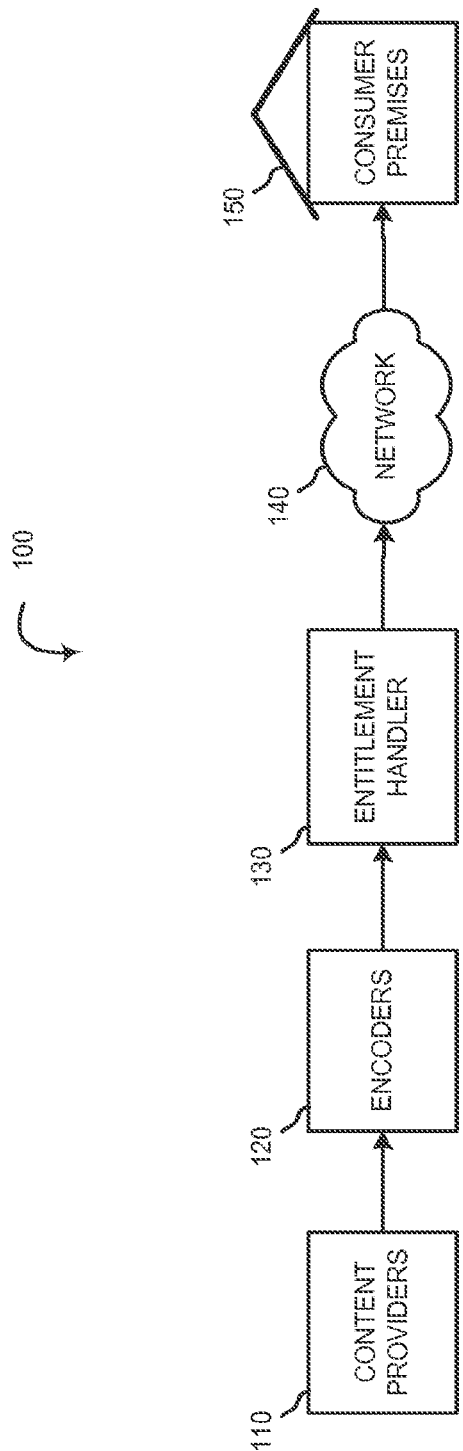
FIG. 1 provides a block diagram of an IPTV system for use with certain embodiments of the invention is provided.

Turning first to FIG. 1, a block diagram of an IPTV system 100 for use with certain embodiments of the invention is provided. The IPTV system 100 is configured to provide IPTV content from one or more content providers 110 to one or more consumer premises 150 over one or more networks 140 through intermediate systems. The intermediate systems may include one or more encoders 120 and entitlement handlers 130.

The content providers 110 may be television studios, television broadcasters, radio broadcasters, motion picture studios, data providers, or any entity that provides content (in any suitable form) that may be provided on demand and/or in real-time to a subscriber. In certain embodiments, one or more of the content provider(s) 110 may have agreements with a service provider to provide content for distribution to subscribers. Such agreements may provide for per-viewing fees payable from the service provider to the content provider 110, for the insertion of advertisements (by the service provider, the content provider 110 and/or another) into content provided to subscribers, restrictions upon how the content may be provided (e.g., chronological windows during which certain content may or may not be provided, terms governing the provision of real-time content later upon demand, etc.), terms related to digital rights management, terms related to the tracking of content provided to subscribers, and/or other terms as appropriate.

Any or all of the content providers 110 may provide IPTV content. IPTV content may include broadcast or multi-cast content, like network and cable television programming, streaming video, video-on-demand, music, animations, captioning, advertisements, etc. IPTV content may also include interactive content, like video games, interactive program guides, e-commerce and t-commerce interfaces, personal broadcast channels, interactive advertisements, search engines, electronic messaging applications (e.g., email, SMS, etc.), web browsing, etc. Further, IPTV content may include personalized or stored content, like personal broadcast channels, recorded audio and video (e.g., music, photos, movies, etc.), closed-circuit television (e.g., home security video), personal profiles, account information, schedules, contacts, etc. Even further, IPTV content may include enhanced network services, like voice-over-IP telephony (e.g., including e-911 capability). In some cases, content providers 110 include content sources (e.g., production facilities), while in other cases, content providers 110 include content stores or re-transmitters (e.g., satellite gateways, local/regional broadcast repeaters, Internet service providers, etc.).

Content providers 110 may pass content to one or more encoders 120. In some embodiments, an encoder 120 may be configured to pass content from the content providers 110 to a network entitlement handler 130. One or both of the encoder 120 and the network entitlement handler 130 may be owned or controlled by a service provider. The service provider may or may not be the same entity as one or more of the content providers 110.

In some embodiments, the encoder 120 is configured to encode received content before passing the content to the network entitlement handler 130. In one embodiment, the encoder 120 applies certain access restriction parameters to the content to prevent access by non-entitled consumers. Applying restriction parameters may be performed by adding header information to digital content files, by encrypting content files, by placing content files in secure locations (e.g., on secure servers), or in any other useful way.

In other embodiments, the encoder 120 is configured to post-process content files for various purposes relating to certain conditions of the network 140, equipment at the consumer premises 150, or a consumer's entitlement. For example, the encoder 120 may have to adjust the resolution, size, bit rate, color depth, or other parameters of content files.

In another example, the encoder 120 may be configured to to transcode the content files into other file formats for compatibility with the a transmission protocol (e.g., the Internet protocol), a media player codec (e.g., MPEG-4), or another component or system.

In still other embodiments, the encoder 120 is configured to use the content files to provide enhanced services. For example, advertisements may be generated and/or added to the content files, content files may be configured for placement in an interactive program guide, or captions may be added to content files. In another example, content files may be parsed, spliced, concatenated, translated, or adjusted in other useful ways.

The encoder 120 may pass the content (e.g., the encoded content) to a network entitlement handler 130. The network entitlement handler 130 may be configured to receive content from the encoder 120 and receive entitlement information from a consumer, and determine based on the entitlement information whether the consumer is entitled to receive the content. In some embodiments, the network entitlement handler 130 acts substantially like a gatekeeper, passively receiving content and determining which content may pass to which consumers. In other embodiments, the network entitlement handler 130 is more active, requesting certain content from content providers 110, possibly based on received entitlement information.

The network entitlement handler 130 may be in communication with a network 140 and is configured to transmit and receive data over the network 140. Of course, each network 140 may include multiple virtual links, each with multiple nodes, or may represent multiple potential paths from one node to another. Merely by way of example, the network 140 may be the Internet. Alternately, the network 140 may be a telecommunication provider's network, including for example, an asynchronous transfer mode ("ATM") network, a time-division multiplexed ("TDM") network, a wireless network (including, for instance, cellular networks, personal communication service ("PCS") networks, 802.11 networks, and the like), and/or a cable television distribution network. In many cases, the network 140 may be a composite of a plurality of these (and other) types of networks. In short, the network 140 can be any public or private network capable of transporting content (e.g., video, audio, data, etc.) as described herein. In some cases, the network 140 will be capable of transmitting packeted data, for instance, data formatted according to the TCP/IP suite of protocols.

One skilled in the art will appreciate that the configuration of the network 140 generally will depend on the type of network service or content provided. Merely by way of example, a POTS and/or DSL network may include one or more switching devices (including without limitation service switching points ("SSP"), signal transfer points ("STP"), and/or service control points ("SCP")), intelligent peripherals and/or other standard devices, as well, perhaps, as one or more interface devices and/or multiplexors, such as a digital subscriber line access multiplexer ("DSLAM"). As another example, a cable television services network may include a cable television head end unit, as well, perhaps as supporting infrastructure. One skilled in the art will appreciate, based on the disclosure herein, that such standard devices may be modified to communicate with devices (including servers, storage devices, etc.) configured to perform the functions described herein, and that such standard devices otherwise may be configured otherwise to perform in a manner known in the art and/or may be modified to perform functions of the invention.

In some embodiments, the network entitlement handler 130 is in communication with equipment at a consumer premises 150 over the network 140. In these embodiments, the network entitlement handler 130 receives entitlement information from the consumer premises 150 over the network 140, and transmits content to the consumer premises 150 over the network 140. It will be appreciated that other components of the IPTV system 100 may be in communication over the network 140 even if they are not shown in that way. For example, the network entitlement handler 130 and the encoder 120 may communicate over the network 140 with the content providers 110. Further, it will be appreciated that all or part of the network 140 may be controlled by one or more of the entities which controls other components in the IPTV system 100.

Content is communicated via the network 140 between the network entitlement handler 130 and one or more consumer premises 150. At each consumer premises 150, there may be consumer premises equipment ("CPE") configured to receive the content. In some embodiments, the CPE is configured to (or is in further communication with equipment configured to) playback the content for the consumer. In some embodiments, the CPE is further configured to receive one or more entitlement keys and to provide entitlement information associated with the entitlement keys to the network entitlement handler 130 over the network 140.

In various embodiments, the CPE may include one or more computers (which may include without limitation, personal computers, workstations, laptop computers, game consoles, etc.), televisions, pagers, telephones (which may include without limitation wired phones, such as POTS phones, SIP phones, VOIP phones, PBX phones, etc., and/or wireless phones, such as GSM phones, cellular phones, etc.), handheld devices (which may include without limitation media players, personal digital assistants, handheld game consoles, e-book readers, etc.), stereo receivers, and/or any other type of device that can be used to present content to a consumer (or another). It is worth noting that CPE is used herein to broadly encompass any device that can present content to consumers, even where the CPE components are portable, not located at a consumer's premises, etc.

In this context, the term "to present content" means any procedure by which content is displayed, played, etc. for consumption by a subscriber; one skilled in the art will appreciate that how a particular set of content is presented often will depend on the nature of the content. Merely by way of example, presenting a television program may comprise receiving, storing and/or displaying a stream of images and/or sounds comprising the television program, while presenting an e-book may comprise simply displaying a text file (or a binary file comprising the relevant text) for the subscriber.

In other embodiments, other consumer connectivity devices may be included in the IPTV system 100 to help provide communication between one or more CPE components and one or more networks (and/or components thereof). Merely by way of example, in certain embodiments, the consumer connectivity device may be a demarcation device (including without limitation a network interface device) such as those described in the applications incorporated by reference above. In other embodiments, the consumer connectivity device may include (and/or be incorporated in) a set-top box, a modem (such as a cable modem, DSL modem, etc.), a router, a firewall or gateway, etc. In some embodiments, a plurality of consumer connectivity devices (e.g., different connectivity devices for different subscriber devices, such as a set top box for a television, a cable modem for a computer, etc.) may be used. In other embodiments, the subscriber connectivity device may be unnecessary (and/or may be integrated with a subscriber device), such that a direct connection between a subscriber device (e.g., a GSM phone) and a provider network (e.g., a wireless network) may be used instead.

It will be appreciated that, depending on the nature of the content to be presented to a subscriber, there may be a need for conversion of the content's format or other post-processing. In accordance with particular embodiments, decoders, CPE components, and/or other devices may be used to convert the format of any content, depending perhaps on the type of subscriber device that may be used to present the content. Further, it will be appreciated that other types of components and/or functionality may be incorporated into the subscriber devices and CPE components to enhance the communication of content between service providers and consumers.

Figure 2:
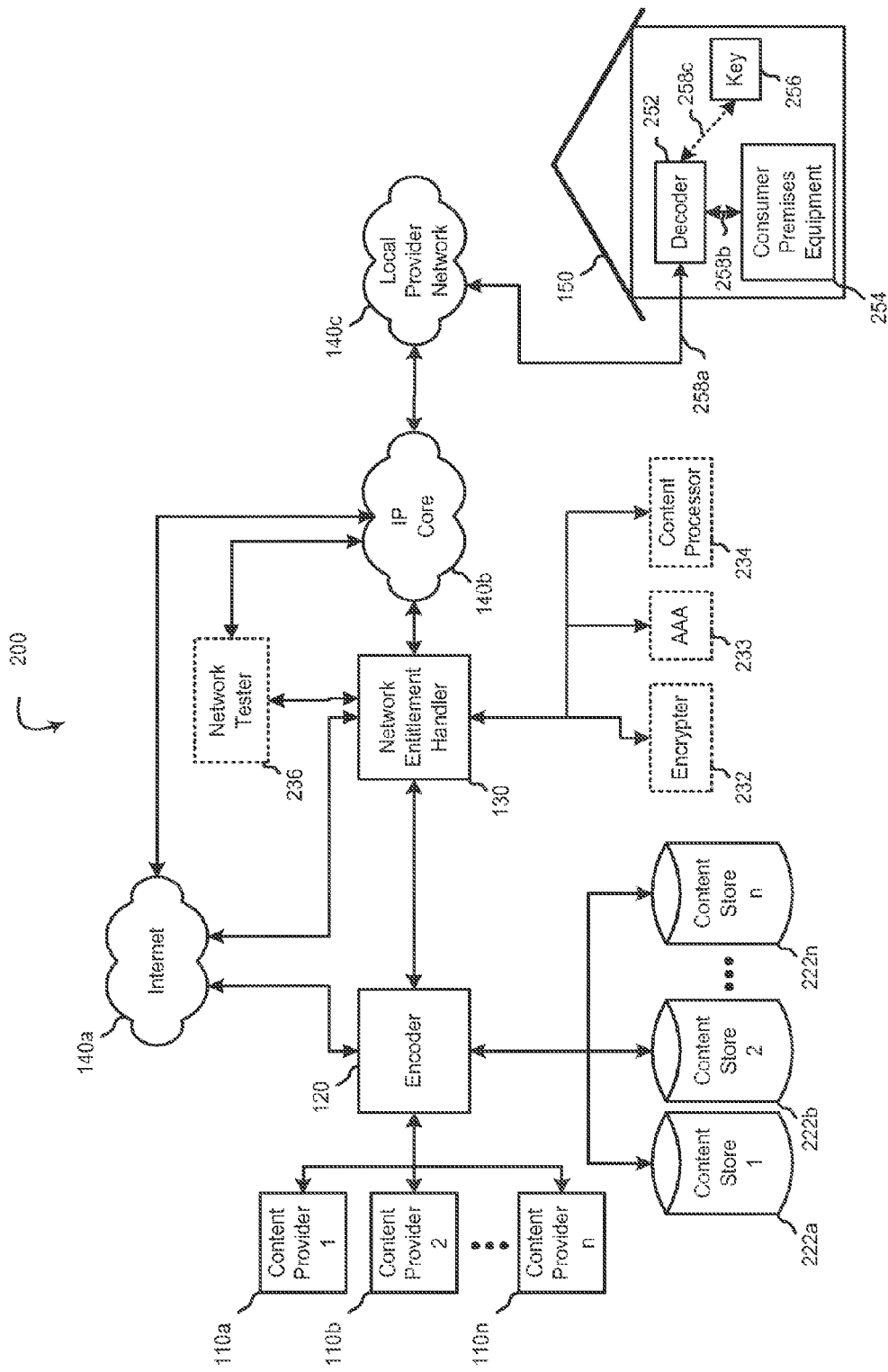
FIG. 2 provides another block diagram of an IPTV system for use with portable entitlement keys according to certain embodiments of the invention.

A more detailed embodiment of the IPTV system 100 is shown in FIG. 2. FIG. 2 provides a block diagram of an IPTV system 200 for use with portable entitlement keys 256 according to certain embodiments of the invention. As in FIG. 1. The IPTV system 200 includes content providers 110, encoders 120, a network entitlement handler 130, networks 140, and consumer premises 150.

The encoder 120 receives content from a plurality of content providers 110 and a plurality of content stores 222. The content stores may be configured to store any useful information, including content and information relating to content (e.g., entitlement requirements, file types, time stamps, etc.). Further, the content stores 222 may store information in any useful way, including as a flat file, a relational database, on distributed servers, etc. For example, the content stores 222 may include one or more hard drives, a drive array (such as a redundant array of inexpensive disks ("RAID")), a storage area network ("SAN"), tape area network ("TAN"), and/or the like. The content stores 222 may be arranged in any of several configurations known in the art, and/or they may be used to provide temporary and/or relatively permanent storage of content, perhaps for delivery on demand. In a set of embodiments, as described in more detail below, the content stores 222 may be used to provide a content library.

In some embodiments, the encoder 120 may receive content from one or more networks 140, like the Internet 140a. For example, the encoder 120 may download, stream, or otherwise receive networked content, including video, audio, RSS feeds, emails, etc. This networked content may be treated in the same or different ways from content received from other sources. In certain embodiments, the encoder 120 may be able to provide content through the network (e.g., through the Internet 140a). For example, the encoder 120 may provide content to the network entitlement handler 130 or to an IP core network 140b over the Internet 140a.

The content from any or all the available content sources may be passed from the encoder 120 to the network entitlement handler 130. The network entitlement handler 130 may include or be connected with various other systems, including an encrypter 232, an authenticator 233, a content processor 234, and a network tester 236. It will be appreciated that these and other components may be configured in alternate ways without departing from the invention. For example, the functions of one or more of the encrypter 232, authenticator 233, content processor 234, and/or network tester 236 may be performed by the encoder 120.

In some embodiments, the encrypter 232 processes some or all of the content received by the network entitlement handler 130 by applying one or more encryption algorithms. For example, content files may be processed to include certain types of digital rights management ("DRM") and copy-protection algorithms. In some cases, the encrypter 232 may apply certain restrictions on content files to prevent access to those files by parties lacking a predetermined entitlement. In other cases, the encrypter 232 may apply certain DRM to content files because of third-party contractual requirements (e.g., a production facility may require that content files are stored with a minimum level of DRM).

In some embodiments, the authenticator 233 authenticates an end consumer of the system. In certain embodiments, the authenticator 233 is an Authentication Accounting Authorization ("AAA") device or system. For example, the authenticator 233 may confirm that a requesting user is valid (e.g., by evaluating credentials, etc.), determine whether the user is authorized to receive the requested services (e.g., based on account restrictions, time of day restrictions, network restrictions, etc.), monitor consumption of network and account resources and account usage (e.g., for billing purposes, etc.), or perform any other similar functions.

In some embodiments, the content processor 234 post-processes some or all of the content received by the network entitlement handler 130 in other ways. For example, the content processor 234 may encode content files for compatibility with transmission protocols (e.g., IP, IGMP, etc.) or media players (e.g., MPEG-4, AVI, etc.). In another example, the content processor 234 may process content files for compatibility with enhanced services (e.g., for picture-in-picture, picture-in-guide, parental controls, translation, captioning, channel slideshows, etc.). In yet another example, the content processor 234 may process content to provide capabilities, like error reporting, error correction, statistical analysis, etc.

In some embodiments, the network tester 236 tests the transmission link between the network entitlement handler 130 and the consumer premises 150. The transmission link may include an IP core network 140b and a local provider network 140c. The network tester 236 may test any useful property of the transmission link, including, for example, congestion, protocols, bandwidth, physical latency, throughput, authorization, cost per bit, etc. In certain embodiments, this information may be used by one or more components of the IPTV system 200 to impact the flow of content. For example, if the network tester 236 detects a temporary low bandwidth or high congestion environment, the encoder 120 may begin caching content files in a content store 222. In another example, the network tester 236 may select among a set of content delivery schemes (e.g., real-time, download, streaming, trickle-cast, etc.) based on the network link conditions. In yet another example, the network entitlement handler 130 may allow certain entitlements based on certain requirements detected by the network tester 236, like minimum bandwidth.

It will be appreciated that the various functions of the network entitlement handler 130 and its components or connected systems may provide multiple tiers or types of entitlement. In one embodiment, a consumer's key information is received by the network entitlement handler 130. Various AAA functions are performed by the authenticator 233 to determine, for example, whether the consumer has a valid account with the system. If the consumer has proper AAA entitlement, other components of the network entitlement handler 130 may determine what level of access is available to the consumer (e.g., which content the consumer may retrieve). Once the system determines that the consumer is valid and authorized to retrieve particular content, the encrypter 232, content processor 234, and network tester 236 may work together to determine how much content, and in which formats, the consumer may retrieve based on restrictions relating to protocol compatibility, bandwidth, quality of service, etc.

It will be further appreciated that the various functions of the network entitlement handler 130 and its components or connected systems may be implemented at other locations or by other components of the IPTV system 200. In one embodiment, network tester 236 functionality is provided by the encoder 120 and, in another embodiment, network tester 236 functionality is provided by the decoder 252 at the consumer premises 150. Of course, based on the design of the IPTV system 200 or other considerations, the functionality of the network entitlement handler 130 may be located at or distributed among any useful location or locations in the IPTV system 200.

It will be even appreciated that many types of processing are possible, which may exploit the portable nature of the entitlement key. In one embodiment, the network tester 236 may determine the geographic location of a portable entitlement key. For example, the key may include a system (e.g., a global positioning satellite ("GPS") system) which determines the location of the key. In another example, the geographic location of a decoder may be detectable by its network address. Once the geographic location of the key is detected, many enhanced capabilities may be possible. For example, say an English-speaking consumer from the United States uses a portable entitlement with a decoder in France. The IPTV system may be able to translate certain content (e.g., television programming, interactive program guides, etc.) into English, suggest certain French programming content based on known US programming preferences of the consumer, etc.

In some embodiments, the network entitlement handler 130 passes content as IP-compatible data to the IP core network 140b. From there, the data may be routed via a local provider network 140c to the consumer premises 150. It will be appreciated that other network configurations are possible according to the invention. For example, some or all of the link between the network entitlement handler 130 and the consumer premises 150 may be dedicated, or may be owned by a single service provider.

Content may be received at the consumer premises 150 by a decoder 252. In some embodiments, the decoder 252 includes a stand-alone device or system, like a set-top box or a computer. In other embodiments, the decoder 252 is a component of a larger system or apparatus. The decoder 252 may include various interfaces. In one embodiment, the decoder 252 includes a network interface 258a for sending and receiving information over a network (e.g., 140c). In another embodiment, the decoder 252 includes a consumer premises equipment ("CPE") interface 258b for connecting with CPE components 254, like televisions, computers, or home networks. In yet another embodiment, the decoder 252 includes a key interface 258c for interfacing with one or more portable entitlement keys 256. Any of these interfaces 258 may include wired or wireless connections involving radiofrequency. Bluetooth, optical, or one or more other connectivity technologies. In still another embodiment, the decoder 252 includes a network tester for determining characteristics of the network. For example, the network tester may be a client of a network tester application provided over the network.

It will be appreciated that many network configurations are possible and that content may flow in many different ways through the network according to the invention. In some embodiments, some local content is provided by localized providers. For example, it may be possible to more efficiently allocate network resources (e.g., bandwidth) by providing some local news only to local viewers most likely to be interested in the programming. An exemplary embodiment for separately providing local programming is shown in FIG.

3, which provides a block diagram of another system 300 for use with portable entitlement keys according to certain embodiments of the invention.

Figure 3:
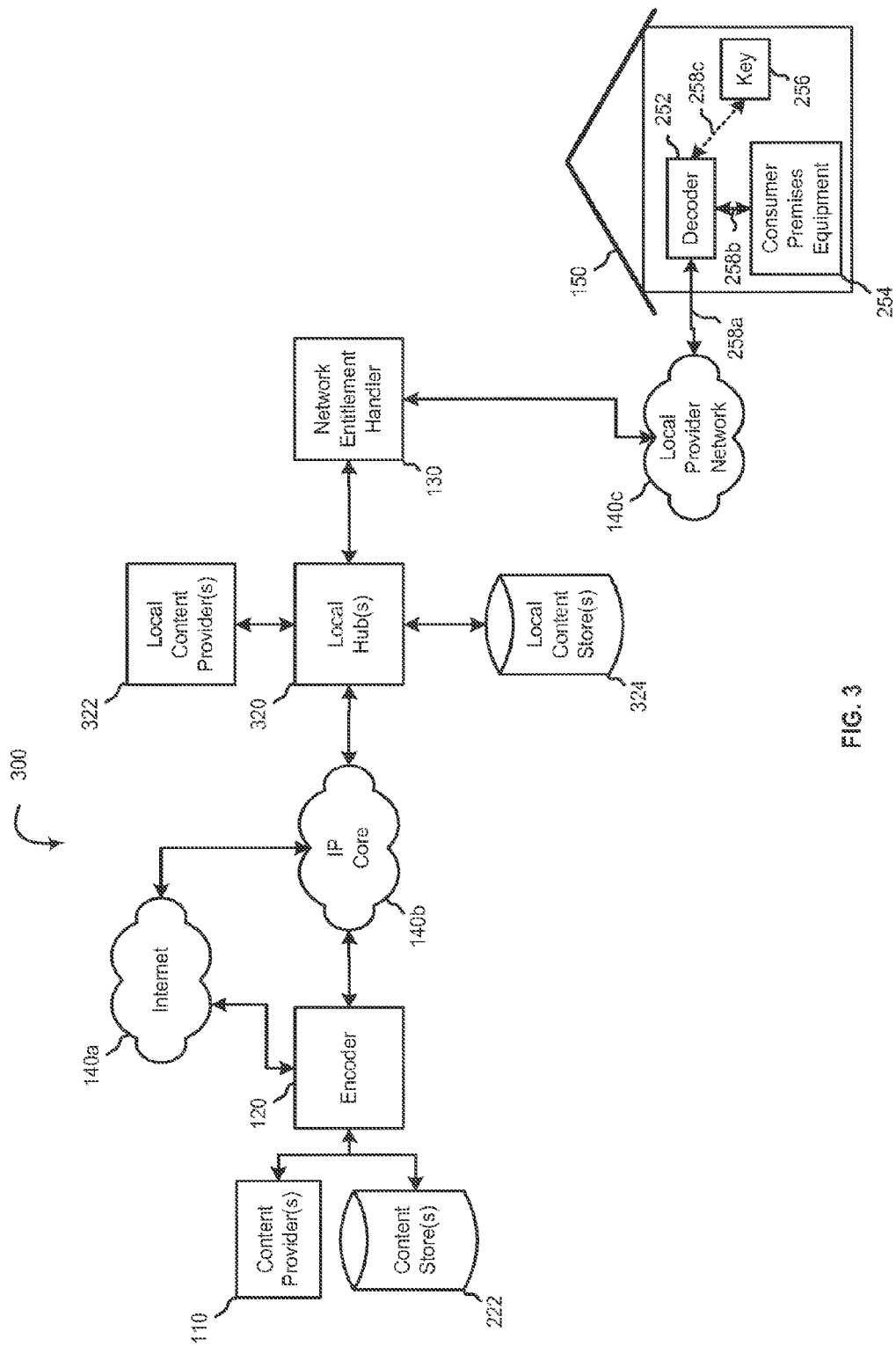
FIG. 3 provides a block diagram of an IPTV system for separately providing local programming according to certain embodiments of the invention.

Like in FIG. 2, the encoder 120 in FIG. 3 receives content from various sources, including content providers 110, content stores 222, and the Internet 140a. However, instead of passing the content directly to a network entitlement handler 130, the encoder 120 passes the content via the IP core network 140b to a local hub 320. In some embodiments, the local hub 320 has similar functionality to the encoder 120. In addition to the content received over the IP core network 140b, the local hub 320 may receive content from local sources, including local content providers 322 and local content stores 324.

In some embodiments, the network entitlement handler 130 may receive content from the local hub 320. In this way, it may be possible to control access to content received from local sources at the local hub 320, in addition to the content received from the encoder 120. As in FIG. 2, the content may then be passed to a consumer premises 150 via a local provider network 140c.

Figure 4:
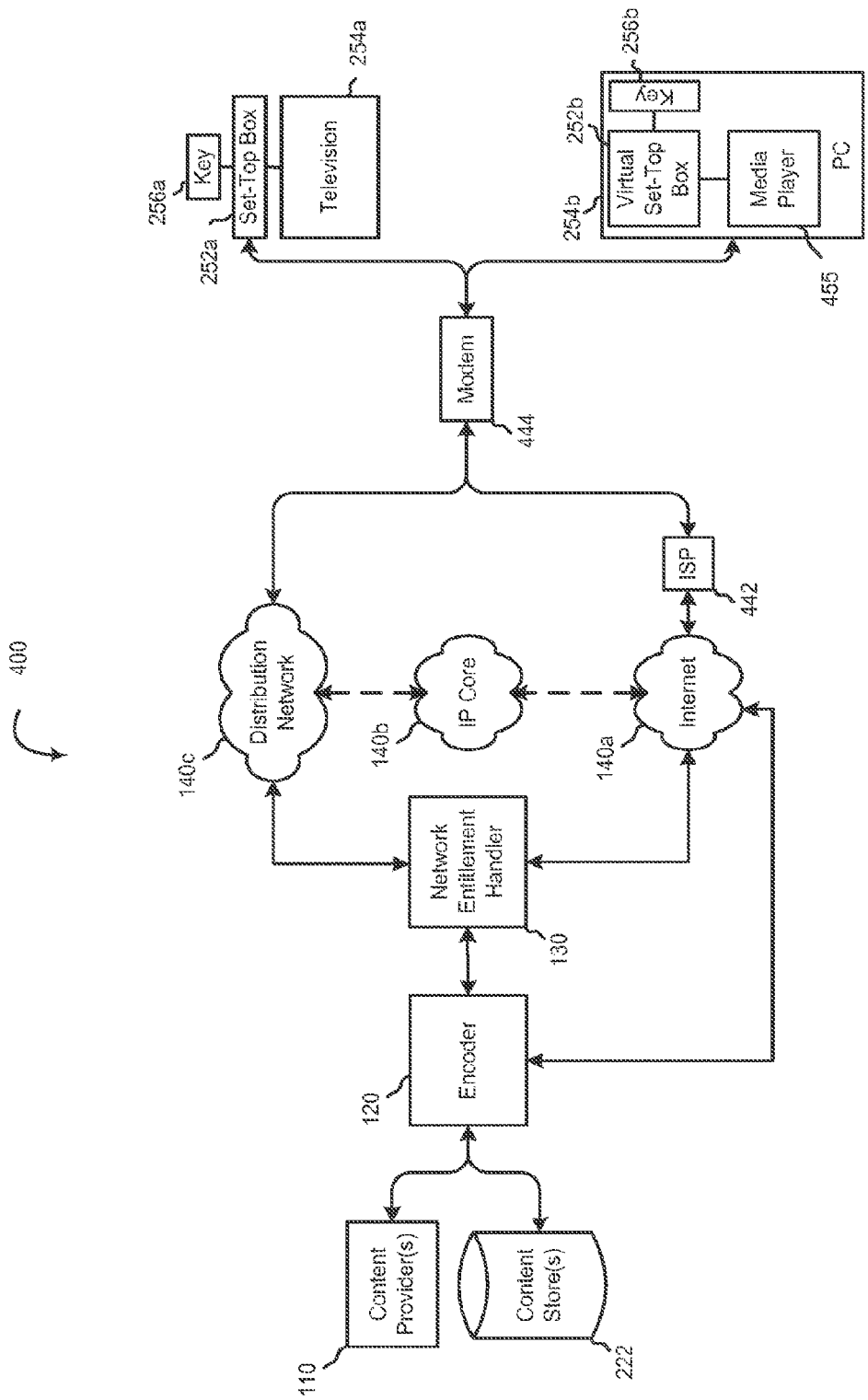
FIG. 4 provides a block diagram of another IPTV system for use with portable entitlement keys and multiple IP-compatible decoders according to certain embodiments of the invention.

It is worth noting that the content may be received at the consumer premises 150 by many types of decoders according to the invention. For example, content compatible with IP may be received by any device configured to decode IP-compatible data. As such, IPTV systems may use one or more components to exploit the extensible nature of IP-compatible data. FIG. 4 provides a block diagram of another IPTV system 400 for use with portable entitlement keys and multiple IP-compatible decoders according to certain embodiments of the invention.

Like in FIG. 2, the encoder 120 in FIG. 4 receives content from various sources, including content providers 110, content stores 222, and the Internet 140a. The encoder 120 may then pass received content to a network entitlement handler 130. The network entitlement handler 130 is configured to communicate with two decoders 252.

The first decoder 252a includes a set-top box, like a cable or satellite television set-top decoder box. The first decoder 252a is configured to receive entitlement information from a first key 256a and to pass the entitlement information to the network entitlement handler 130 (e.g., over a distribution network 140c). When the first decoder 252a is entitled, the network entitlement handler 130 may then pass requested content to the first decoder 252a (e.g., over the distribution network 140c). The first decoder 252a may then decode the content received from the network entitlement handler 130 so it may be played by a connected CPE component 254a (e.g., a television).

The second decoder 252b includes a virtual set-top box, like a software decoder on a computer system 254b. The second decoder 252b is configured to receive entitlement information from a second key 256b and to pass the entitlement information to the network entitlement handler 130 (e.g., over the Internet 140a). When the second decoder 252b is entitled, the network entitlement handler 130 may then pass requested content to the computer system 254b (e.g., over the Internet 140a) to be received by the second decoder 252b. The second decoder 252b may then decode the content received from the network entitlement handler 130 so it may be played by a media player 455 (e.g., a software media player with a compatible codec configured to run on the computer system 254b).

In some embodiments, additional components may be required to help pass the content to various types of decoders. In certain embodiments, as depicted in FIG. 4, a modem 444 may be required to receive content from a network 140 and pass the data to the decoder 252. For example, the decoder 252 may not be able to decode IP-compatible data, and may require transcoding into an intermediate data format by the modem 444. In another example, the decoder 252 may not include a compatible port (e.g., a network connection may require an Ethernet port, while a set-top box may include only coaxial ports). In other embodiments, as also depicted in FIG. 4, content may pass through intermediate systems or entities, like an Internet service provider (ISP) 442. For example, a consumer's television service provider may be different from the consumer's ISP. To pass television content over the consumer's Internet connection, then, may require passing the content from the television service provider to the ISP.

Figure 5:
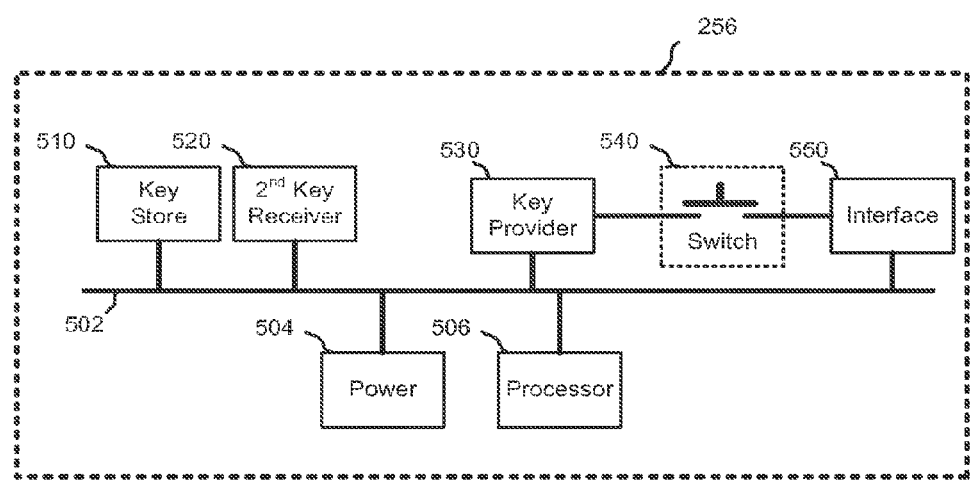
FIG. 5 provides a block diagram of an exemplary portable entitlement key for use with certain embodiments of the invention.

It will be appreciated that the functions of the various embodiments of systems and components described above may be performed by different types of hardware and/or software without departing from the invention. For example, FIG. 5 provides a block diagram of a portable entitlement key 256 for use with certain embodiments of the invention. It is worth noting that a key may include a "hard" key (e.g., a USB or serial device which may physically interface with a CPE component) or a "soft" key (e.g., an encrypted software key stored in memory on a computer-readable medium). As such, the term "key" should be construed broadly to encompass any type of "hard" or "soft" key, or any type of key delivery system or apparatus, as described further below.

The portable entitlement key 256 includes a key store 510, a key provider 530, and an interface 550. The key store 510 may include any type of data storage configured to store key information. In some embodiments, the key information may include a unique code associated with an account (e.g., a unique binary number). It is worth noting that in certain embodiments, the key is fixed (e.g., hard-coded), while in other embodiments, the key changes periodically based on a predetermined algorithm.

The key provider 530 may include any components necessary to provide the key information to a decoder via the interface 550. In one embodiment, the key provider 530 transmits the key information through the interface 550. For example, the key provider 530 may receive key information from the key store 510 and modulate it with a carrier frequency for wireless transmission. In another embodiment, the key provider 530 passively provides the key information. For example, a decoder may be able to pull the key information from the key provider 530 through the interface 550. It is worth noting that the key provider 530 may simply include a passive conduit between the interface 550 and the key store 510, configured to allow access through the interface 550 to the key information stored in the key store 510.

The interface 550 may be configured to couple the portable entitlement key 256 with a decoder to allow key information to pass from the key provider 530 to the decoder through the interface 550. In some embodiments, the interface 550 includes a physical interface configured to physically couple with a decoder. For example, the interface 550 may include a male or female USB-compatible port. In other embodiments, the interface 550 includes a wireless (i.e., non-contact) interface. For example, the interface 550 may include an electromagnetic (e.g., radio-frequency, Bluetooth, optical, etc.) transmitter for transmitting key information to the decoder.

In some embodiments, the key store 510, key provider 530, and interface 550 are all coupled to each other and to a power source 504 via a bus 502. In some embodiments, the power source includes a source capable of providing enough electrical power for the operation of the portable entitlement key 256. For example, the power source 504 may include a battery, a capacitor, an inductor, a generator, a transformer, etc.

In other embodiments, the power source 504 includes an interface to an external power source, like a wall outlet.

In other embodiments, the portable entitlement key 256 further includes a processor 506. The processor 506 may be configured to control the operation of one or more of the other components of the power source 504. For example, the processor 506 may control how the key information is provided by the key provider 530. In certain embodiments, the processor 506 is configured to perform additional processing functions. For example, the processor 506 may encrypt or decrypt key information prior to providing the key information through the interface 550.

In still other embodiments, the portable entitlement key 256 further includes a switch 540. The switch 540 may be coupled between the key provider 530 and the interface 550, or in any other useful location. The function of the switch 540 may be to allow the transmission of key information from the key provider 530 through the interface 550 when closed. In certain embodiments, the switch 540 may be used to conserve power. For example, the components of the portable entitlement key 256 may be solid state electronics, configured to be "off" (i.e., to consume little or no power) when the switch 540 is open. The switch 540 may be any useful type of switch, including push-button, toggle, rocker, pressure sensitive, heat sensitive, optical, etc.

In yet other embodiments, the portable entitlement key 256 is configured to use a second key receiver 520 to receive second key information. The second key information may be used to validate the first key information stored in the key store 510. In one embodiment, the second key receiver 520 includes a keypad configured to receive a passcode. In another embodiment, the second key receiver 520 includes a biometric sensor (e.g., a fingerprint reader) configured to receive biometric information.

In different embodiments, the second key information may be used differently to validate the first key information. In one embodiment, the second key information is mathematically related to the first key information by some predefined algorithm. The first key information and the second key information may then be input to the algorithm for validation (e.g., by the processor 506 or the key provider 530). In another embodiment, the second key information is passed to the key provider 530 for transmission to a decoder via the interface 550. The second key information may then be used to validate the first key information by another system (e.g., the decoder, a network entitlement handler, etc.).

It will be appreciated that the operation of the portable entitlement key 256 may depend on which components are included and how they are configured. In one embodiment, simply placing the portable entitlement key 256 in proximity to a decoder allows key information to be received by the decoder. In another embodiment, the portable entitlement key 256 is configured so that key information is transmitted to the decoder only after the switch 540 is depressed and an appropriate passcode is entered on the second key receiver 520.

It will be further appreciated that various interfaces, decoders, CPE components, and other system elements are possible, depending on the configuration of the portable entitlement key 256. It is worth noting that a decoder may be configured to receive key information from multiple types of portable entitlement keys 256, and that a portable entitlement key 256 may be configured to interface with multiple types of decoders. Various conceptual configurations of portable entitlement keys 256, a decoder 252, and CPE components 254 are illustrated in FIG. 6.

Figure 6:
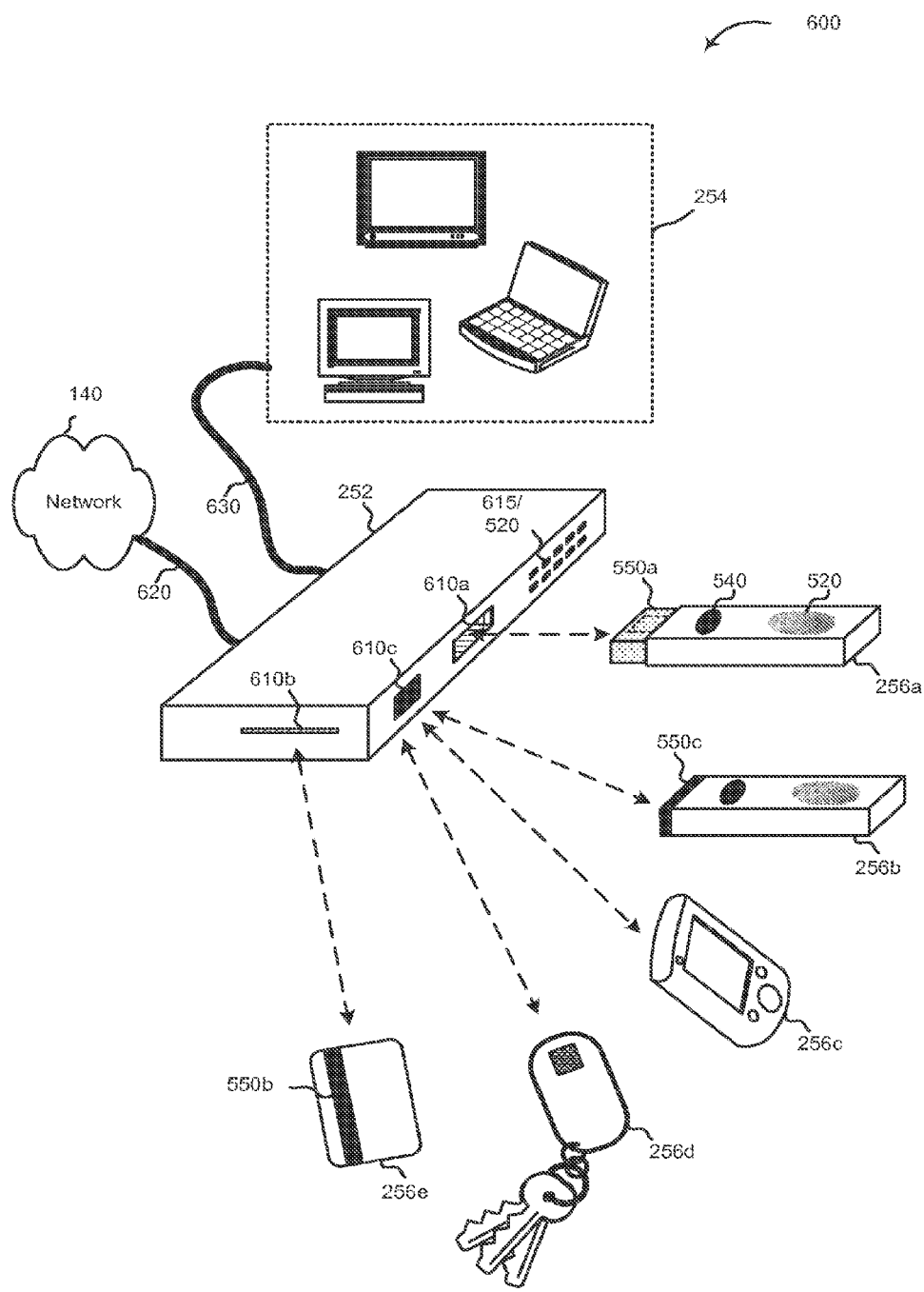
FIG. 6 provides various conceptual configurations of portable entitlement keys, a decoder, and CPE components according to certain embodiments of the invention.

FIG. 6 provides five exemplary embodiments of a portable entitlement key 256. The first embodied portable entitlement key 256*a* may be configured with external dimensions similar to a USB "thumb" drive, examples of which are known to those skilled in the art. The portable entitlement key 256*a* includes a second key receiver 520 (i.e., a thumbprint reader), a switch 540, and an interface 550*a*. The interface 550*a* is a USB-compatible interface, configured to physically and electrically couple with a complimentary USB-compatible interface 610*a* on the decoder 252.

It will be appreciated that many shapes and types of devices are possible for interfacing with a physical port. Further, many other types of ports are possible. The second embodied portable entitlement key 256*e*, for example, is configured to be the shape and size of a standard credit or debit card. The second portable entitlement key 256*e* may physically interface with a magnetic stripe reader 610*b*, configured to read key information stored on a magnetic stripe 550*b* on the second portable entitlement key 256*e*.

The third embodied portable entitlement key 256*b* is similar to the first embodied portable entitlement key 256*a*, in that it is configured to look similar to a USB "thumb" drive, and includes a second key receiver 520 (i.e., a thumbprint reader) and a switch 540. However, the third portable entitlement key 256*b* includes a non-contact interface 550*c*. The interface 550*c* is configured to electromagnetically (or otherwise) couple with a compatible non-contact interface 610*c* on the decoder 252. The electromagnetic interface 610 on the decoder 252 may include a radio-frequency receiver, an antenna, a light detector, or any other component useful for providing a non-contact interface.

It will be appreciated that many other devices may include the components necessary to provide key information via the non-contact interface 610*c* on the decoder 252. The fourth embodied portable entitlement key 256*c* is configured to operate within the footprint of a portable wireless device (e.g., a cell phone, a personal digital assistant (PDA), a pager, etc.). The fourth portable entitlement key 256*c* may be configured to use multi-use components in the operation of the fourth portable entitlement key 256*c*. For example, buttons on the keypad of a cell phone may be usable as a second key receiver 520 or a switch 540. Similarly, the antenna on a wireless device may be usable as an interface 550. The fifth embodied portable entitlement key 256*d* is configured to operate within the footprint of a key fob. In one example, the key fob may include radio-frequency identification (RFID) or smart card technology. In another example, the key fob may include solid state components configured as shown in FIG. 5.

In some embodiments, the decoder 252 includes other interface components 615. In one embodiment, the interface component 615 is a keypad, configured to be a second key receiver 520. In another embodiment, the interface components 615 are configured to allow a user to control the operation of the decoder 252. It will be appreciated that the interface components 615 and any of the various interfaces 610 may be configured for multiple purposes. For example, the non-contact interface 610*c* may be further configured to receive remote control commands for further operation of the decoder 252.

In some embodiments, the decoder 252 is further configured to couple with a network 140 via a network interface 620, and to couple with a CPE component 254 via a CPE interface 630. The network interface 620 and the CPE interface 630 may be different, depending on what types of networks 140 and/or CPE components 254 may potentially be coupled with the decoder 252. For example, the network interface 620 may be a coaxial cable which connects a coaxial port on the decoder 252 to a coaxial port in a consumer's residence (which is further connected to a cable television service provider network). Similarly, the network interface 620 may include an Ethernet connection, a wireless connection to a router, xDSL, or any other useful network interface. The CPE interface 630 may include a coaxial cable for connecting to a television, an Ethernet cable for connecting with a home network router, an optical cable for connection with a monitor, or any other useful interface.

It will be appreciated that in some embodiments, the decoder 252 is a virtual decoder, and not a physical apparatus. As such, the various functions and interfaces may be the same as or different from those described above. For example, any or all of the functions and interfaces described above may be implemented in a combination of software and hardware (or firmware, etc.) components. In one embodiment, the key interfaces 610 and network interface 620 may include physical ports coupled with the chassis of a laptop computer, the functionality of the decoder 252 may be performed by the microprocessor of the computer, and the CPE interface 630 may include a virtual interface with the computer's monitor and associated media-playing software applications.

Figure 7:
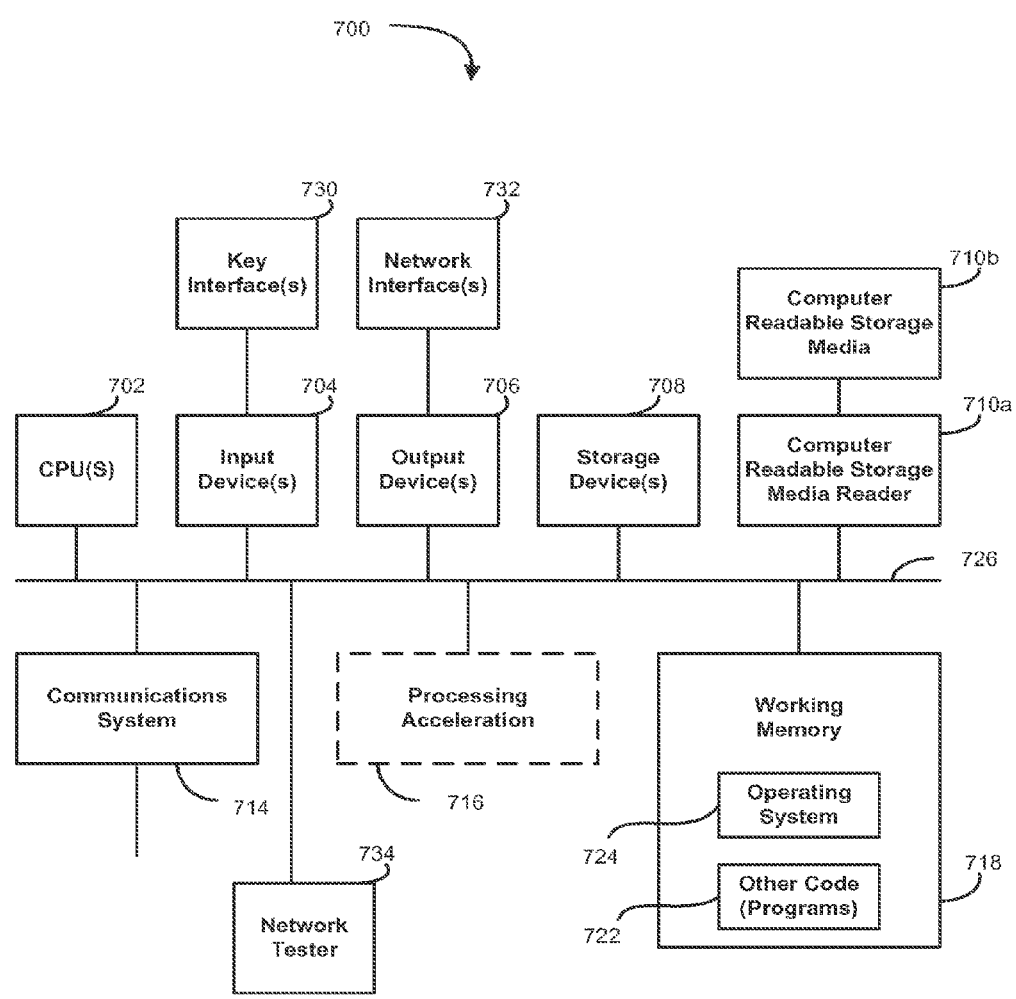
FIG. 7 provides a block diagram of a computational system for implementing certain embodiments of the invention.

FIG. 7 provides a block diagram of a computational system 700 for implementing certain embodiments of the invention. In one embodiment, the computation system 700 may function as a decoder, like the decoder 252 in FIG. 2. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 726 (or may otherwise be in communication, as appropriate). The hardware elements can include one or more processors 702, including without limitation one or more general-purpose processors and/or one or more special-purpose processors (such as digital signal processing chips, graphics acceleration chips, and/or the like); one or more input devices 704, which can include without limitation a mouse, a keyboard, and/or the like; and one or more output devices 706, which can include without limitation a display device, a printer, and/or the like.

The computer system 700 may further include (and/or be in communication with) one or more storage devices 708, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computer system 700 might also include a communications subsystem 714, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 714 may permit data to be exchanged with a network (such as the network described below, to name one example), and/or any other devices described herein. In many embodiments, the computer system 700 will further comprise a working memory 718, which can include a RAM or ROM device, as described above.

The computer system 700 also may comprise software elements, shown as being currently located within the working memory 718, including an operating system 724 and/or other code, such as one or more application programs 722, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium 710*b*. In some embodiments, the computer readable storage medium 710*b* is the storage device(s) 708 described above. In other embodiments, the computer readable storage medium 710*b* might be incorporated within a computer system, such as the system 700. In still other embodiments, the computer readable storage medium 710*b* might be separate from the computer system (i.e., a removable medium, such as a compact disc, etc.), and or provided in an installation package, such that the storage medium can be used to configure a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code. In these embodiments, the computer readable storage medium 710*b* may be read by a computer readable storage media reader 710*a*.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In some embodiments, one or more of the input devices 704 may be coupled with a key interface 730. The key interface 730 may be configured to interface with a portable entitlement key, for example physically, optically, electromagnetically, etc. Further, in some embodiments, one or more of the output devices 706 may be coupled with a network interface 732. The network interface 732 may be configured to interface with one or more networks, including, for example, being configured to transmit or receive data over the network(s).

In various embodiments, a network tester unit 734 is provided in communication with the bus 726. The network tester unit 734 may test all or part of a content distribution network (e.g., a transmission link between a network entitlement handler and consumer premises). The tested network may include local area networks, local provider networks, IP core networks, etc. The network tester unit 734 may test any useful property of the network, including, for example, congestion, protocols, bandwidth, physical latency, throughput, authorization, cost per bit, etc.

In one embodiment, the invention employs a computer system (such as the computer system 700) to perform methods of the invention. According to a set of embodiments, some or all of the procedures of such methods are performed by the computer system 700 in response to processor 702 executing one or more sequences of one or more instructions (which might be incorporated into the operating system 724 and/or other code, such as an application program 722) contained in the working memory 718. Such instructions may be read into the working memory 718 from another machine-readable medium, such as one or more of the storage device(s) 708 (or 710). Merely by way of example, execution of the sequences of instructions contained in the working memory 718 might cause the processor(s) 702 to perform one or more procedures of the methods described herein. In this way, the computer system 700 can be "configured to" perform any number of such procedures or methods.

The terms "machine readable medium" and "computer readable medium," as used herein, refer to any medium that participates in providing data that causes a machine to operate in a specific fashion. In an embodiment implemented using the computer system 700, various machine-readable media might be involved in providing instructions/code to processor(s) 702 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (708 or 710). Volatile media includes, without limitation dynamic memory, such as the working memory 718. Transmission media includes coaxial cables, copper wire and fiber optics, including the wires that comprise the bus 726, as well as the various components of the communication subsystem 714 (and/or the media by which the communications subsystem 714 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 702 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals, and/or the like, are all examples of carrier waves on which instructions can be encoded, in accordance with various embodiments of the invention.

The communications subsystem 714 (and/or components thereof) generally will receive the signals, and the bus 726 then might carry the signals (and/or the data, instructions, etc. carried by the signals) to the working memory 718, from which the processor(s) 702 retrieves and executes the instructions. The instructions received by the working memory 718 may optionally be stored on a storage device 708 either before or after execution by the processor(s) 702.

Figure 8A:
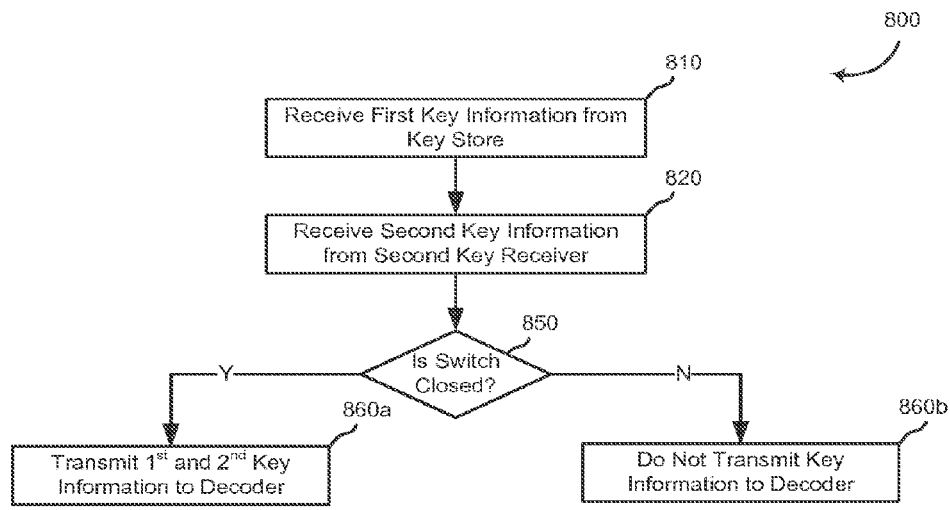
FIG. 8A provides an exemplary method for using portable entitlement keys in an IPTV environment.

It will be appreciated that the various systems and apparatuses described above may perform many methods according to the invention. Some exemplary methods according to the invention are provided in FIGS. 8-10. FIG. 8A provides an exemplary method 800 for using portable entitlement keys in an IPTV environment.

The method 800 begins at block 810 by receiving first key information from a key store. In some embodiments, second key information is received from a second key receiver at block 820. The method 800 may then determine at decision block 850 whether the switch is closed (e.g., toggled to "on," depressed, etc.).

If the switch is determined to be closed at block 850, the first and second key information may be transmitted or provided to a decoder at block 860a (e.g., through an interface). The decoder, or some other component of an IPTV system may then verify the key information. If the switch is determined not to be closed at block 850, the first and second key information may not be provided to a decoder at block 860b.

Figure 8B:
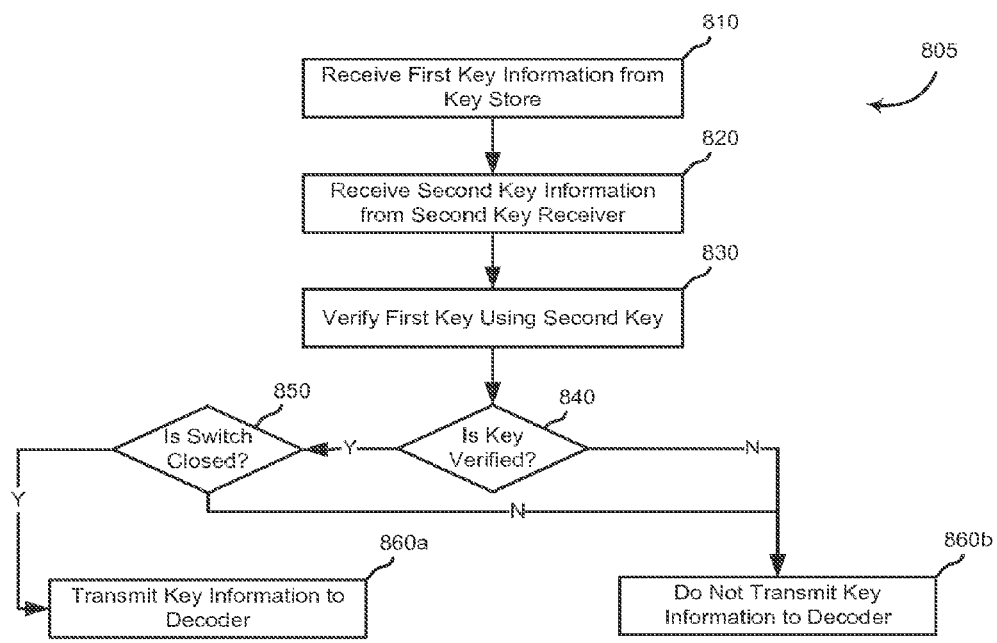
FIG. 8B provides another exemplary method for using portable entitlement keys in an IPTV environment.

FIG. 8B provides another exemplary method 805 for using portable entitlement keys in an IPTV environment. As in FIG. 8A, the method 805 receives first key information from a key store at block 810 and second key information from a second key receiver at block 820. The method 805 may then verify the first key information using the second key information (or vice versa) at block 830.

At decision block 840, a determination is made of whether the key information is valid. If the key information has been verified as valid at block 840, the method may then determine at decision block 850 whether the switch is closed (e.g., toggled to "on," depressed, etc.). If the switch is determined to be closed at block 850, the first and second key information may be transmitted or provided to a decoder at block 860a (e.g., through an interface). If the switch is determined not to be closed at block 850, or if the key information was determined not to be valid at block 840, the first and second key information may not be provided to a decoder at block 860b.

Figure 9:
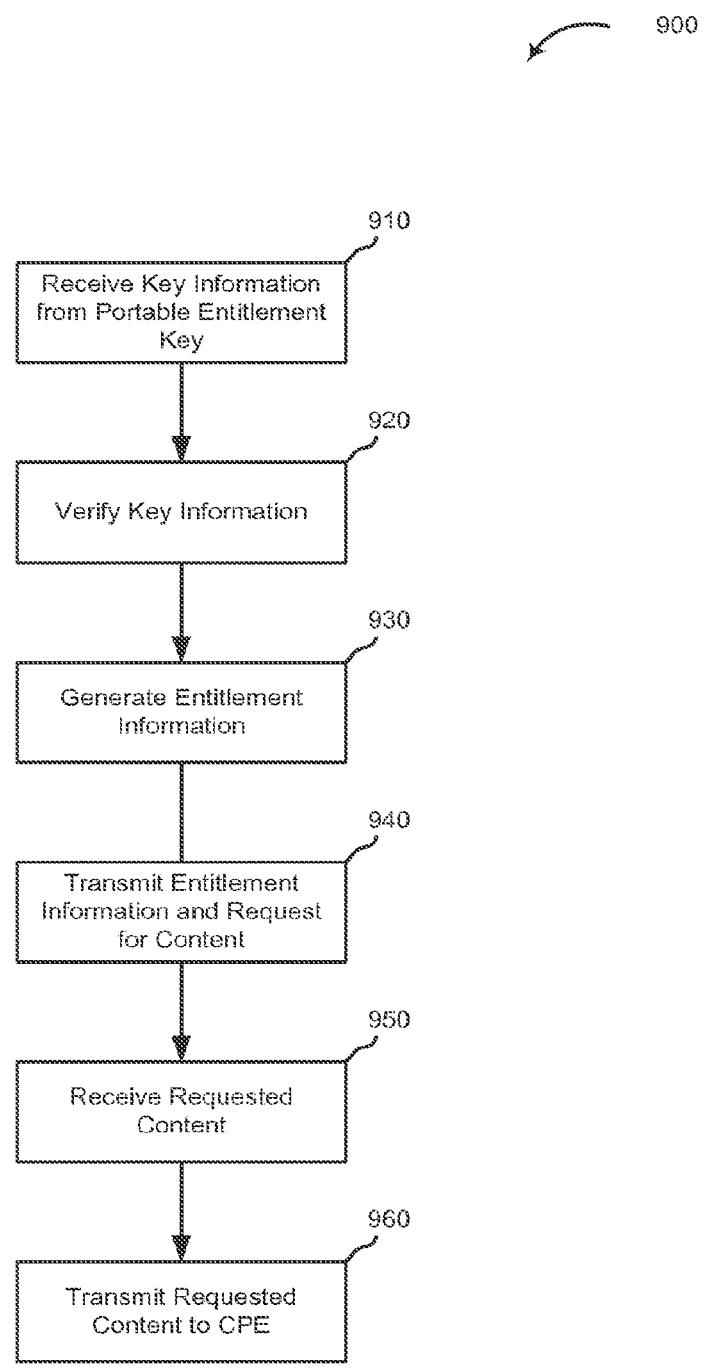
FIG. 9 provides an exemplary method for using decoders with portable entitlement keys in an IPTV environment.

Turning to FIG. 9, an exemplary method 900 for using decoders with portable entitlement keys in an IPTV environment is provided. The method 900 begins at block 910 by receiving key information from a portable entitlement key. For example, the key information may include a content distribution provider name, an address (e.g., an IP address, URL, etc.) for a decoder or key server, a user key (e.g., a public-private key pair), a user password or biometric, etc. In some embodiments, the key information has already been verified by the portable entitlement key. In other embodiments, the decoder verifies the key information at block 920. After receiving valid key information, entitlement information may be generated at block 930.

The entitlement information and a request for content may then be transmitted at block 940 (e.g., to a network entitlement handler or key server over a network). In some embodiments, various entitlement processes may be performed, as discussed above. In one example, AAA authentication may be performed on the requesting user. In another example, the network and end-user devices may be tested to determine whether they are compatible with or capable of certain types of content distribution. In yet another example, the end-user device may be read to determine whether compatible viewers of the content are available (and possibly prompting the user to install compatible viewers if unavailable).

Based at least on the entitlement and which content is requested, the requested content may then be received at block 950. The received content may also include compatible viewers for installation, electronic program guides and related information, advertisements, and any other desired information. In some embodiments, the requested content may then be passed at block 960 to a device or system capable of playing the content (e.g., a CPE component or a media-playing software application).

It is worth noting that in some embodiments, the method may wait for an active request by a user before sending content over the network or before playing the content on a content player. For example, the user may select a program on an electronic program guide, at which point one or more of the steps of the method 900 may occur. In other embodiments, content may be distributed automatically, or based on other parameters. For example, the user may request that, whenever he is connected to the content provider network, certain television programs, podcasts, movies, music, and/or other content should be sent to his decoder for storage. In other examples, various components, systems, and/or method steps may be adapted for use with video streaming, video-on-demand, queuing, and other possible uses of the content distribution network.

Figure 10:
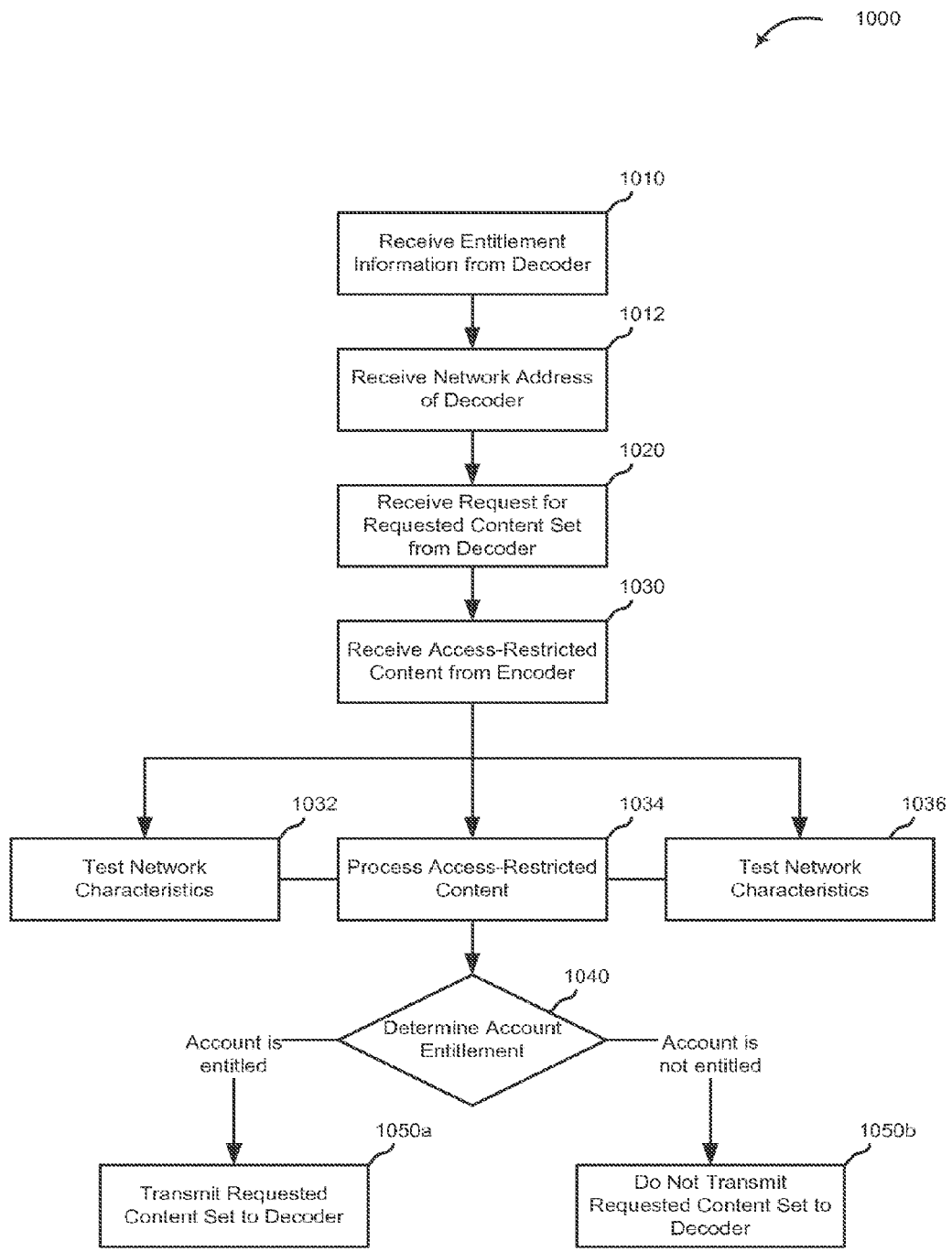
FIG. 10 provides an exemplary method for using network entitlement handlers in an IPTV environment with portable entitlement keys.

FIG. 10 provides an exemplary method 1000 for using network entitlement handlers in an IPTV environment with portable entitlement keys. The method 1000 begins at block 1010 by receiving entitlement information from a decoder, for example, over a network. In some embodiments, a network address is also received at block 1012 to allow the location of a decoder in a network. At block 1020, a requested content set may also be received from the decoder.

The method 1000 may further receive access-restricted content from an encoder or other content provider at block 1030. In some embodiments, the access-restricted content includes the requested content. Further, in some embodiments the method 1000 may perform certain steps to further handle the communication of information, for example, between the decoder and the network entitlement handler. In one embodiment, the access-restricted content may be encrypted at block 1032. In another embodiment, the access-restricted content may be otherwise processed at block 1034 (e.g., by transcoding, modulating, sorting, parsing, etc.). In yet another embodiment, communication links and other network characteristics may be tested for certain parameters at block 1036.

In some embodiments, at block 1040, the method 1000 then determines account entitlement, for example, based on the entitlement information received at block 1010 and the content request received at block 1020. If the account is entitled to receive the requested content, the requested content may be passed to the decoder at block 1050*a*. If the account is not entitled to receive the requested content, the requested content may not be passed to the decoder at block 1050*b*.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without-certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. An apparatus, comprising:
a user input device that receives a user authentication input from a user;
a key storage device, on which is stored a key that is associated with a set of access rights for an account;
a key transmission device that transmits the key to a decoder device, the decoder device providing access to a set of access-restricted content associated with the user, based on a determination that the account has an entitlement to receive a requested content set that is included in the set of access-restricted content, wherein the access-restricted content associated with the user is displayed to the user associated with the access-restricted content on a device that is unassociated with the user or a premises of the user; and
a processor that:
determines whether the received user authentication input authorizes the user to use the account;
allows transmission, by the key transmission device, of the key to the decoder device, based on a determination that the received user authentication input authorizes the user to use the account; and
prevents transmission, by the key transmission device, of the key to the decoder device, based on a determination that the received user authentication input does not authorize the user to use the account.

2. The apparatus of claim 1, wherein the key transmission device comprises an electromagnetic interface that is configured to send the key to the decoder wirelessly via electromagnetic signals.

3. The apparatus of claim 2, wherein sending the key to the decoder wirelessly via electromagnetic signals comprises sending the key over an 802.11 network.

4. The apparatus of claim 2, wherein the electromagnetic interface comprises a radio-frequency transmitter, and wherein sending the key to the decoder wirelessly via electromagnetic signals comprises sending the key using the radio-frequency transmitter.

5. The apparatus of claim 2, wherein the electromagnetic interface comprises a Bluetooth transmitter, wherein sending the key to the decoder wirelessly via electromagnetic signals comprises sending the key using the Bluetooth transmitter.

6. The apparatus of claim 2, wherein the electromagnetic interface comprises an optical transmitter, wherein sending the key to the decoder wirelessly via electromagnetic signals comprises sending the key using the optical transmitter.

7. The apparatus of claim 1, wherein the key transmission device comprises a physical interface that is configured to send the key to the decoder over a physical connection.

8. The apparatus of claim 7, wherein the physical interface comprises a USB-compatible interface, and wherein sending the key to the decoder over the physical connection comprises sending the key using the USB-compatible interface.

9. The apparatus of claim 7, wherein the physical interface comprises a magnetic stripe, and wherein sending the key to the decoder over the physical connection comprises sending the key using the magnetic stripe to interact with a magnetic stripe reader on the decoder device.

10. The apparatus of claim 1, wherein the user input device comprises a biometric sensor, wherein the user authentication input comprises biometric information of the user.

11. The apparatus of claim 10, wherein the biometric sensor comprises a fingerprint sensor, wherein the biometric information of the user comprises at least one fingerprint of the user.

12. The apparatus of claim 1, wherein the processor compares the received user authentication input with a stored user authentication input.

13. A method, comprising:
receiving, with a user input device, a user authentication input from a user;
determining, with a processor, whether the received user authentication input authorizes the user to use the account;
based on a determination that the received user authentication input authorizes the user to use the account, allowing transmission, by a key transmission device, of a key to a decoder device, the key being stored in a key storage and the key being associated with a set of access rights for an account, the decoder device providing access to a set of access-restricted content associated with the user, based on a determination that the account has an entitlement to receive a requested content set that is included in the set of access-restricted content, wherein the access-restricted content associated with the user is displayed to the user associated with the access-restricted content on a device that is unassociated with the user or a premises of the user; and
based on a determination that the received user authentication input does not authorize the user to use the account, preventing transmission, by the key transmission device, of the key to the decoder device.

14. The method of 13, wherein transmission, by the key transmission device, of the key to the decoder device comprises wireless transmission of the key via electronic signals using an electromagnetic interface.

15. The method of 14, wherein wireless transmission of the key comprises sending the key over an 802.11 network.

16. The method of 14, wherein wireless transmission of the key comprises sending the key using a radio-frequency transmitter.

17. The method of 14, wherein wireless transmission of the key comprises sending the key using a Bluetooth transmitter.

18. The method of 14, wherein wireless transmission of the key comprises sending the key using an optical transmitter.

19. The method of 13, wherein transmission, by the key transmission device, of the key to the decoder device comprises transmission of the key over a physical connection.

20. The method of 19, wherein sending the key to the decoder over the physical connection comprises sending the key using the USB-compatible interface.

21. The method of 19, wherein sending the key to the decoder over the physical connection comprises sending the key using the magnetic stripe to interact with a magnetic stripe reader on the decoder device.

22. The method of 13, wherein receiving the user authentication input from the user comprises receiving biometric information from the user.

23. The method of 22, wherein the biometric information of the user comprises at least one fingerprint of the user.

* * * * *